United States Patent Office 3,429,080
Patented Feb. 25, 1969

3,429,080
COMPOSITION FOR POLISHING CRYSTALLINE
SILICON AND GERMANIUM AND PROCESS
Raymond L. Lachapelle, Reading, Pa., assignor to Tizon Chemical Corporation, Flemington, N.J., a corporation of New Jersey
No Drawing. Filed May 2, 1966, Ser. No. 546,538
U.S. Cl. 51—309            10 Claims
Int. Cl. C04b *31/16;* C01b *33/00*

ABSTRACT OF THE DISCLOSURE

Compositions which in the presence of water have a pH within the range from about 4.5 to about 14 are provided for polishing crystalline silicon and crystalline germanium. These are composed of at least one silicon or germanium polishing compound having a particle size not in excess of about 20 microns and an oxidizing compound to increase the polishing effectiveness of the polishing compound.

A process for polishing crystalline silicon and crystalline germanium is also provided, using an aqueous slurry of such compositions.

---

This invention relates to polishing compositions formulated especially for the rapid polishing of crystalline silicon and crystalline germanium to produce a smooth planar surface, and to a process for polishing crystalline silicon and crystalline germanium employing aqueous slurries of such compositions, and, more particularly, to silicon and germanium polishing compositions comprising a silicon and germanium polishing agent and an oxidizing agent, and to a process for polishing silicon and germanium employing such compositions.

Monocrystalline silicon and germanium or single crystal silicon and germanium are now widely used in the manufacture of transistors and like equipment. The silicon or germanium crystal is prepared in ingot form. The ingots usually are rather large, of the order of ½ inch in diameter and 2 to 4½ inches long. The silicon or germanium is sliced from the ingot in very thin sheets, having thicknesses of only several thousandths of an inch, and these sheets are then polished to produce as planar a surface as possible. It is important that the surface be absolutely plane and free from scratches, pits and like defects, since the conductivity of silicon and germanium is in the plane along their surface, and any surface defects disadvantageously affect the conductivity, and therefore the effectiveness, of the device in which the silicon or germanium is used.

The polishing compositions in general use for silicon comprise a polishing agent such as cerium oxide, aluminum oxide, red rouge (ferric oxide), zirconium oxide or silicon dioxide slurried in water. The polish is applied to the silicon surface, and the polishing effected with a polishing pad. The polishing agents now in use are, however, rather slow, and a considerable polishing time is required to smooth the surface. Moreover, some of the polishing agents, such as aluminum oxide, have a tendency to produce scratches, which can be rather deep, and the longer the polishing time required, the greater the tendency of the surface to acquire polishing defects of this type.

The polishing of germanium is in fact more difficult to effect than the polishing of silicon, because germanium is somewhat harder, and has required the use of elevated temperatures, under which conditions it is even more difficult to obtain a smooth damage-free surface in a reasonable polishing time.

Reisman and Rohr, Journal of the Electrochemical Society, III, 1425–1428 (1964) describe efforts by several workers in this field to develop a suitable germanium polishing material. Bogenschütz and Schütze, Z. angew. Phys., 14, 475 (1962) employed a 0.3% boiling sodium hypochlorite solution, but obtained a cobblestone effect. The same result, Reisman and Rohr report, is obtained using a mixture of nitric acid and hydrogen fluoride. Reisman and Rohr obtained a similarly defective surface using boiling sodium hypochlorite solution in various dilutions, together with erratic pitting, but they reported that at room temperature better surfaces could be obtained, although a very long etching time was required. The removal rate obtained was only 0.8 to 1.3 mil per hour, corresponding to approximately 70 mgs. for a disk of standardized test size 25.4 mms. in diameter.

In accordance with the invention, it has been determined that if the polishing of silicon and germanium is carried out with an aqueous slurry of a polishing agent in the presence of an oxidizing compound, the speed of polishing is very greatly increased, and a better quality planar surface is produced, substantially free from polishing defects, such as pits and scratches. The invention accordingly provides a polishing composition consisting essentially of a polishing agent for silicon and germanium, and an oxidizing compound in an amount to enhance the polishing effectiveness of the polishing agent in the presence of water employed as a suspending agent for the polishing composition.

The invention is applicable to the polishing of any silicon or germanium surface, but is especially adapted for the polishing of crystalline silicon and crystalline germanium, and silicon and germanium monocrystals.

Any polishing agent which is useful in the polishing of silicon can be employed in the polishing compositions of the invention for both silicon and germanium. Zirconium oxide, cerium oxide, aluminum oxide, silicon dioxide or white rouge, and ferric oxide or red rouge are useful. Commercial grades of these materials containing minor proportions of other oxides as impurities can also be used, such as the commercial grades of cerium oxide containing cerium oxide in admixture with other rare earth oxides, such as thorium oxide, for examle, Barnesite and Rareox.

Zirconium oxide is a preferred oxide because it is not only rapid, but gives a superior surface which is completely free from surface blemishes. Of the various crystal forms of zirconium oxide, the monoclinic form can be used as well as any of the various cubic forms, including the so-called stabilized cubic forms which are available. A preferred cubic form is that described and claimed in U.S. Patent No. 2,996,369, dated Aug. 15, 1961. Commercial grades of zirconium oxide polishing agents are available under the trademarks Lustrox, Vibrox and Zirox.

Alpha-aluminum oxide $\alpha\text{-}Al_2O_3$ as sold by Linde under the trademark Linde Type A can be used, and is a typical commercial grade of alumina.

The polishing effectiveness of the polishing agent is very greatly enhanced by the incorporation of an oxidizing compound therewith. Any oxidizing compound can be employed. Oxidizing compounds are well known as compounds capable of oxidizing other materials and of becoming themselves reduced in the process, and the term is used generically in the conventional sense understood in the art. Such compounds are also referred to as oxidizing agents.

In the formulation of solid polishing compositions that can be easily stored and marketed until ready for use by combination with water, it is preferred to employ solid oxidizing agents, such as the various inorganic higher oxides and salts, for example, sodium peroxide, potassium perdisulfate, potassium permanganate, potassium bichromate, sodium chlorate, potassium chlorate, calcium hypochlorite, sodium hypochlorite, lithium hypochlorite, barium peroxide, sodium periodate, manganese dioxide, organic oxidizing salts, such as lead tetraacetate and organic oxidizing compounds, such as trichlorocyanuric acid and quinone.

Liquid polishing compositions in concentrated or dilute form can be formulated using liquid oxidizing agents, such as hydrogen peroxide, peracetic acid, sulfuric acid, nitric acid, phosphoric acid, hypochlorous acid, performic acid, perbenzoic acid, and pyrosulfuric acid, as well as aqueous solutions of any of the solid compounds mentioned above.

Such compositions can be marketed as slurry concentrates, ready for use by dilution with water to a polishing concentration of the polishing agent.

Very small amounts of the oxidizing compound are effective to enhance the polishing effectiveness of the polishing agent. As little as 0.25% by weight of the polishing composition will greatly enhance the rate of polishing, as measured by the rate of removal of silicon or germanium from the surface being polished per unit of time. Very satisfactory polishing rates are obtained using amounts of oxidizing agent within the range from about 0.5 to about 20% by weight of the composition.

There is no upper limit on the amount of oxidizing compound. Amounts as high as 35% have been used satisfactorily. The amount of oxidizing agent is not limited even by the solubility of the agent in the solution, since a super-saturated solution can be employed, the undissolved material gradually entering into the solution as the oxidizing agent is consumed during the polishing. It is, however, important that the oxidizing agent not be present in a sufficient amount to attack the polishing equipment under the polishing conditions.

The pH of the aqueous polishing slurry is not critical. In some cases, however, polishing compositions containing the oxidizing agent and polishing agent are not stable in the presence of water at a pH below 4.5, and many polishing slurries at such low acidic pHs also may be corrosive to the equipment. The maximum pH is normally about 13, but some polishing slurries have been employed at a pH of 14 without disadvantageous effect and with good polishing rates.

The compositions of the invention can be formulated by mixing the polishing agent and the oxidizing agent, or grinding them together to form a homogeneous mixture. The polishing agent should be in finely-divided form, not in excess of about 20 microns in particle size. Since the oxidizing compound is normally dissolved in the water used, the particle size of the oxidizing agent is not critical, but of course, a particle that is rapidly dissolving in water is desirable. The compositions can be formulated as solid mixtures or as aqueous slurries, and sold as such. The user of the composition will add water to a solid composition, or may dilute an aqueous solution or slurry to produce a polishing slurry of the desired concentration and consistency, usually containing of the order of from about 10 to about 50% polishing agent by weight of the slurry.

The polishing is carried out at room temperature by applying the aqueous slurried polishing composition to the silicon or germanium surface, and then polishing with a felt or other type of polishing pad. The so-called commerical bowl-feed polisher is quite satisfactory, as are other commercially used or modified polishing or lapping machines. Typical polishing pads are, for example, Pellon Pan W, a nonwoven cellulose fiber fabric, plastic-filled pad, Blu Streak, a woven wool felt pad, Resin-Impregnated Blu Streak, a woven wool felt pad impregnated with Belro resin, Resin 1481, and Resin 1375 woven felt pads, both being impregnated with Belro resin, and Rowland Products LP-57, an especially formulated polyurethane pad.

During the polishing, water should be added from time to time to compensate for evaporation loss, and maintain a constant concentration of polishing composition, but this is not essential.

The polishing characteristics of the composition are not exhausted in one polishing. On the contrary, the polishing efficiency will at least remain constant and may even increase over the first three to five thirty-minute polishings, and then continues at a high level for many additional polishings. If the pH shows a tendency to decrease, this can be corrected by the addition of an alkali or alkaline compound. Thus, it is not only possible but actually more economical to reuse the polishing slurry for many successive polishing operation.

The polishing agents can be used in admixture, and in many cases, this may be advantageous. For example, mixtures of the monoclinic and cubic forms of zirconium oxide can be used, as well as mixtures of cerium oxide and/or zirconium oxide and/or aluminum oxide and/or silicon oxide and/or red rouge.

The following examples in the opinion of the inventor represent the preferred embodiments of his invention.

A standardized polishing test was used to evaluate the polishing effectiveness in the examples, carried out as follows.

A standard amount of polishing composition to be evaluated, 50 grams, was thoroughly mixed in 100 cc. of distilled water, and a round silicon or germanium disk was then polished for ten minutes using a standard commercial bowl-feed polisher with a Pellon Pan W or an LP-57 Rowland pad ⅛ inch thick. Slurries were added during the test at a constant rate, to maintain a concentration of polishing agent on the surface being polished and the polishing lap. At the end of the test, the silicon or germanium disk was examined for the quality and degree of planarity of the surface, and the presence of surface cracks and blemishes, and it was also weighed. The test was repeated for three additional test silicon or germanium wafers. The total weight loss in milligrams for the four runs was then obtained, and averaged as the measuring standard for polishing effectiveness of the composition.

Examples 1 to 4

A group of polishing compositions was prepared by blending 50 grams of zirconium oxide with 100 cc. of water, and then adding to each of the resulting compositions the amount of 30% hydrogen peroxide solution shown in the table which follows. Each of these compositions was then evaluated for polishing effectiveness on germanium wafers, using the standardized polishing test and a Rowland pad. The following results were obtained:

TABLE I

| Example No. | Grams of 30% hydrogen peroxide solution | Removal rate of germanium (mg. per 10 minutes) | pH |
| --- | --- | --- | --- |
| Control | 0 | 13.3 | 6.55 |
| 1 | 1 | 14.0 | 5.55 |
| 2 | 3 | 15.5 | 5.35 |
| 3 | 6 | 16.3 | 5.35 |
| 4 | 10 | 20.0 | 5.1 |

The very considerable enhancement of the polishing effectiveness of the zirconium oxide by the hydrogen peroxide is evident from the above data. The degree of enhancement increases as the amount of hydrogen peroxide is increased.

The surface of the germanium was examined for blemishes and scratches at the conclusion of each test. The finished surface polished with the zirconium oxide alone was absolutely smooth and scratch-free. The surface of the germanium polished with the polishing composition containing hydrogen peroxide was also absolutely smooth and scratch-free, showing that the hydrogen peroxide had no effect on the quality of the polish, even though greatly increasing the rate of removal of germanium.

Examples 5 to 16

A series of aqueous polishing slurries was prepared composed of 33⅓% Lustrox M brand cubic zirconium oxide together with the oxidizing compounds noted in the table below, in amounts of 0.1%, 1% and 5% by weight of the slurry. These slurries were then applied to the polishing of germanium wafers in the standardized polishing test, using a Pellon Pan W pad, with the results noted in the table.

TABLE II

| Example No. | Oxidizing compound and amount | Removal rate of germanium (mg. per 10 minutes) | pH |
|---|---|---|---|
| Control | None | 12 | 7.2 |
| | 30% $H_2O_2$: | | |
| 5 | 0.1% | 17 | |
| 6 | 1.0% | 47 | 6.3 |
| 7 | 5% | 64 | |
| | Sodium peroxide $Na_2O_2$: | | |
| 8 | 1% | 16 | 12.3 |
| 9 | 5% | 26 | |
| | Potassium perdisulfate $K_2S_2O_8$: | | |
| 10 | 1% | 14 | 6.6 |
| 11 | 5% | 14 | |
| | Potassium permanganate $KMnO_4$: | | |
| 12 | 0.1% | 16 | |
| 13 | 1% | 55 | 6.25 |
| 14 | 5% | 97.5 | |
| | Sodium hypochlorite NaOCl: | | |
| 15 | 1% | 67.5 | 9.45 |
| 16 | 1.75% | 82.5 | 9.4 |

The data show the considerable enhancement of the polishing effectiveness of the polishing compound with increasing amounts of the oxidizing compound, as compared to the control. Potassium permanganate, one of the strongest oxidizing agents used, gave by far the greatest enhancement of polishing effectiveness.

The surface of the germanium was examined after each test, and found to be absolutely smooth and scratch-free, just as in the control.

Examples 17 to 35

A group of aqueous polishing slurries was prepared composed of 33⅓% of the polishing agent listed in Table III below, and 1% by weight of the slurry of the oxidizing agent noted in the table. These slurries were then used in the polishing of germanium wafers in the standardized polishing test, using a Pellon Pan W pad, with the results noted in the table.

TABLE III

| Example No. | Polishing agent and oxidizing compound | Removal rate of germanium (mg. per 10 minutes) |
|---|---|---|
| | Red rouge ($Fe_2O_3$): | |
| Control | None | 80 |
| 17 | Potassium Permanganate | 150 |
| 18 | NaOCl | 225 |
| | White rouge (silicon dioxide): | |
| Control | None | 160 |
| 19 | 30% $H_2O_2$ | 200 |
| 20 | $KMnO_4$ | 200 |
| 21 | NaOCl | 280 |
| | BARNESITE #85 (rare earth oxide): | |
| Control | None | 25 |
| 22 | 30% $H_2O_2$ | 50 |
| 23 | $KMnO_4$ | 150 |
| 24 | NaOCl | 160 |
| | Cerox (cerium oxide): | |
| Control | None | 51 |
| 25 | 30% $H_2O_2$ | 150 |
| 26 | $Na_2O_2$ | 100 |
| 27 | $KMnO_4$ | 150 |
| 28 | NaOCl | 240 |
| | LUSTROX (zirconium oxide): | |
| Control | None | 25 |
| 29 | 30% $H_2O_2$ | 200 |
| 30 | $Na_2O_2$ | 80 |
| 31 | $KMnO_4$ | 110 |
| 32 | NaOCl | 300 |
| | RAREOX (cerium oxide): | |
| Control | None | 25 |
| 33 | 30% $H_2O_2$ | 70 |
| 34 | $KMnO_4$ | 175 |
| 35 | NaOCl | 250 |

It is evident from the above data that the oxidizing agents tested in each instance considerably enhanced the polishing effectiveness of the polishing agents.

The surface of the germanium was examined in each instance, and found to be absolutely smooth and scratch-free, just like the controls.

Examples 36 to 53

A series of polishing compositions was prepared composed of 33⅓% of the finely-divided polishing agents noted in Table IV below, together with 1% by weight of the oxidizing compounds noted in the table. Each composition was used to polish silicon wafers in the standardized test, using a Pellon Pan W pad. The results are shown in Table IV.

TABLE IV

| Example No. | Polishing agent and oxidizing agent | Weight of silicon removal (mg. per 10 minutes) |
|---|---|---|
| | CEROX (cerium oxide): | |
| Control | None | 16 |
| 36 | $H_2O_2$ | 26 |
| 37 | $Na_2O_2$ | 20 |
| 38 | $KMnO_4$ | 29 |
| 39 | $K_2S_2O_8$ | 20 |
| 40 | NaOCl | 62 |
| | LUSTROX (zirconium oxide): | |
| Control | None | 15 |
| 41 | $H_2O_2$ | 18 |
| 42 | $Na_2O_2$ | 17 |
| 43 | $KMnO_4$ | 20 |
| 44 | NaOCl | 50 |
| | RAREOX (cerium oxide): | |
| Control | None | 12 |
| 45 | $KMnO_4$ | 28 |
| 46 | NaOCl | 52 |
| | BARNESITE (rare earth oxides): | |
| Control | None | 17 |
| 47 | $H_2O_2$ | 25 |
| 48 | $Na_2O_2$ | 20 |
| 49 | NaOCl | 35 |
| | White rouge (silicon dioxide): | |
| Control | None | 30 |
| 50 | $KMnO_4$ | 40 |
| 51 | NaOCl | 60 |
| | Red rouge (ferric oxide): | |
| Control | None | 8 |
| 52 | $KMnO_4$ | 27 |
| 53 | NaOCl | 35 |

The above data show the enhancement of the polishing effectiveness of the polishing agent by the oxidizing compound in the polishing of silicon.

The surfaces were examined for scratches and blemishes after each polishing, and were found to be absolutely smooth and scratch-free, just as were the controls.

Having regard to the foregoing disclosure, the following is claimed as the inventive and patentable embodiments thereof:

1. A crystalline silicon and crystalline germanium polishing composition consisting essentially of from about 65 to about 99.75% by weight of at least one silicon or germanium polishing compound selected from the group consisting of zirconium oxide, cerium oxide, aluminum oxide, silicon dioxide, ferric oxide, and mixtures thereof, and mixtures of cerium oxide and rare earth oxides, in particulate form, having a particle size of not in excess of about 20 microns, and from about 0.25 to about 35% by weight of an oxidizing compound to increase the polishing effectiveness of the polishing compound, the composition having a pH in the presence of water within the range from about 4.5 to about 14.

2. A silicon and germanium polishing composition in accordance with claim 1, in which the polishing compound is zirconium oxide.

3. A silicon and germanium polishing composition in accordance with claim 1, in which the polishing compound is ferric oxide.

4. A silicon and germanium polishing composition in accordance with claim 1, in which the polishing compound is rare earth oxides.

5. A silicon and germanium polishing composition in accordance with claim 1, in which the polishing compound is silicon dioxide.

6. A silicon and germanium polishing composition in accordance with claim 1, in which the oxidizing compound is a peroxide.

7. A silicon and germanium polishing composition in accordance with claim 1, in which the oxidizing compound is a permanganate.

8. A silicon and germanium polishing composition in accordance with claim 1, in which the oxidizing compound is hypochlorite.

9. A silicon and germanium polishing composition in accordance with claim 1, comprising water in an amount to form a slurry.

10. A process for polishing crystalline silicon and crystalline germanium, which comprises applying to the surface of the silicon or germanium a slurry composition consisting essentially of a polishing composition in accordance with claim 9 and polishing the silicon or germanium surface therewith.

References Cited
UNITED STATES PATENTS

| | | | |
|---|---|---|---|
| 1,452,093 | 4/1923 | Pollack | 51—302 |
| 1,863,002 | 6/1932 | Beck et al. | 51—307 |
| 3,071,456 | 1/1963 | Cheesman | 51—307 |
| 2,694,004 | 11/1954 | Coffeen | 51—308 |
| 2,955,030 | 10/1960 | Baldwin et al. | 51—308 |
| 3,131,039 | 4/1964 | Nonamaker | 51—307 |

DONALD J. ARNOLD, *Primary Examiner.*

U.S. Cl. X.R.

51—307, 317; 106—3